US012137739B2

(12) United States Patent
Mironov et al.

(10) Patent No.: US 12,137,739 B2
(45) Date of Patent: Nov. 12, 2024

(54) FLUID PERMEABLE HEATER ASSEMBLY FOR AEROSOL-GENERATING SYSTEMS

(71) Applicant: Altria Client Services LLC, Richmond, VA (US)

(72) Inventors: Oleg Mironov, Cudrefin (CH); Ihar Nikolaevich Zinovik, Peseux (CH)

(73) Assignee: Altria Client Services LLC, Richmond, VA (US)

( * ) Notice: Subject to any disclaimer, the term of this patent is extended or adjusted under 35 U.S.C. 154(b) by 638 days.

(21) Appl. No.: 15/607,928

(22) Filed: May 30, 2017

(65) Prior Publication Data

US 2017/0347401 A1 Nov. 30, 2017

Related U.S. Application Data

(63) Continuation of application No. PCT/EP2017/062257, filed on May 22, 2017.

(30) Foreign Application Priority Data

May 31, 2016 (EP) .................................... 16172198

(51) Int. Cl.
*A24F 40/46* (2020.01)
*H05B 1/02* (2006.01)
(Continued)

(52) U.S. Cl.
CPC ........... *A24F 40/46* (2020.01); *H05B 1/0277* (2013.01); *H05B 3/145* (2013.01); *H05B 3/34* (2013.01);
(Continued)

(58) Field of Classification Search
CPC ......... A24F 47/00; A24F 47/008; H05B 3/10; H05B 3/12; H05B 3/20; H05B 3/24; H05B 3/26; H05B 3/34
(Continued)

(56) References Cited

U.S. PATENT DOCUMENTS 4,133,738 A * 1/1979 Will ........................ H01M 4/70 204/294
9,689,049 B2 * 6/2017 Matsumoto .......... H05B 3/0023
(Continued)

FOREIGN PATENT DOCUMENTS

CN 102425023 B 5/2014
CN 102443954 B 7/2014
(Continued)

OTHER PUBLICATIONS

International Search Report and Written Opinion issued Sep. 13, 2017 in International Application No. PCT/EP2017/062257.
(Continued)

*Primary Examiner* — Sang Y Paik

(74) *Attorney, Agent, or Firm* — Harness, Dickey & Pierce, P.L.C.

(57) ABSTRACT

A fluid permeable heater assembly for aerosol-generating systems includes an electrically conductive flat filament arrangement and a first contact point and a second contact point for electrically contacting the flat filament arrangement. A longitudinal axis is defined between the first contact point and the second contact point. A center resistance Rc is the electrical resistance between two points situated on the longitudinal axis. One of the two points is situated at a distance from the first contact point equal to about 40 percent and the other one of the two points being situated at a distance from the first contact point equal to about 60 percent.

15 Claims, 2 Drawing Sheets

(51) Int. Cl.

| | |
|---|---|
| ***H05B 3/14*** | (2006.01) |
| ***H05B 3/34*** | (2006.01) |
| ***H05B 3/36*** | (2006.01) |
| *A24F 40/10* | (2020.01) |

(52) U.S. Cl.
CPC ................ *H05B 3/36* (2013.01); *A24F 40/10* (2020.01); *H05B 2203/021* (2013.01)

(58) Field of Classification Search
USPC ......... 219/520, 538, 539, 540, 541; 392/404
See application file for complete search history.

(56) References Cited

U.S. PATENT DOCUMENTS

| | | | | |
|---|---|---|---|---|
| 2012/0153688 | A1* | 6/2012 | Gerken | H05B 3/06 297/180.12 |
| 2013/0168382 | A1* | 7/2013 | Teramoto | H05B 3/345 219/529 |
| 2013/0192618 | A1* | 8/2013 | Li | A24F 47/008 131/329 |
| 2013/0213419 | A1 | 8/2013 | Tucker et al. | |
| 2013/0264096 | A1* | 10/2013 | Chaput | C25B 11/03 174/126.2 |
| 2013/0333700 | A1* | 12/2013 | Buchberger | B05B 7/0012 128/203.26 |
| 2014/0109921 | A1* | 4/2014 | Chen | A24F 47/008 131/273 |
| 2014/0268604 | A1* | 9/2014 | Wicker | B29C 70/82 264/445 |
| 2015/0090280 | A1 | 4/2015 | Chen | |
| 2016/0338410 | A1* | 11/2016 | Batista | H05B 3/265 |
| 2018/0220494 | A1* | 8/2018 | Kim | H01B 7/0054 |

FOREIGN PATENT DOCUMENTS

| | | | | |
|---|---|---|---|---|
| CN | 104470387 A | 3/2015 | | |
| CN | 104768407 A | 7/2015 | | |
| CN | 104540404 B | 8/2018 | | |
| DE | 20111067 U1 | 9/2001 | | |
| EP | 1195656 A2 * | 4/2002 | ......... | G03G 15/2053 |
| KR | 10-2015-0145263 A | 12/2015 | | |
| TW | 200735704 A | 9/2007 | | |
| TW | 201132229 A | 9/2011 | | |
| TW | 201544020 A | 12/2015 | | |
| TW | 201601600 A | 1/2016 | | |
| TW | 201603725 A | 2/2016 | | |
| TW | 201609000 A | 3/2016 | | |
| WO | WO-2015/117701 A1 | 8/2015 | | |
| WO | WO-2015/117702 A1 | 8/2015 | | |
| WO | WO-2015/117704 A1 | 8/2015 | | |
| WO | WO-2016/005533 A1 | 1/2016 | | |

OTHER PUBLICATIONS

International Preliminary Report on Patentability for corresponding International Application No. PCT/EP2017/062257 dated Dec. 13. 2018.
Extended European Search Report for European Application No. 16172198.0 Dated Sep. 19, 2016.
Kazakhstan Notice of Allowance for corresponding Application No. 2018/0933.1, dated Dec. 30, 2019, English translation thereof.
Russian Notice of Allowance and Search Report for corresponding Application No. 2018145554, dated Jun. 19, 2020.
Chinese Office Action dated Feb. 1, 2021, issued in corresponding Chinese Patent Application No. 201780028197.1.
Indian Examination Report dated Feb. 2, 2021 for corresponding Indian Application No. 201817034852, and English-language translation thereof.
Taiwanese Official Action and Search Report dated Apr. 7, 2021 for TW Patent Application No. 106117197, with translation (21 pages).
Taiwanese Office Action for corresponding TW Patent Application No. 106117197 dated Sep. 14, 2021 (received Sep. 22, 2021), with English translation (18 pages).
Ukrainian Notice of Allowance dated May 25, 2021 for corresponding UA Patent Application A201810800, with English translation.
Japanese Official Action dated May 10, 2021 for corresponding JP Patent Application No. 2018-562072, with English translation.
European Notice of Opposition for corresponding EP Patent 3462938, dated Aug. 20, 2021 (29 pages).
Mitchell, Brian S., "An Introduction to Materials Engineering and Science for Chemical and Materials Engineers", John Wiley & Sons, 30.01.2004, ISBN: 0-471-43623-2.
Malaysian Examination Report for corresponding MY Patent Application No. PI2018703371, dated Aug. 23, 2021 (3 pages).
Brazilian Office Action in corresponding BR Patent Application No. 112018072909-4 dated Sep. 27, 2021, with English language translation.
European Summons to Attend Oral Proceedings for EP Patent No. 3462938, dated May 9, 2022 (14 pages).
Australian Examination Report for AU Patent Application No. 2017275531 dated Apr. 14, 2022 (7 pages).
Taiwanese Office Action for corresponding TW Patent Application No. 106117197 dated Nov. 4, 2022 (English translation).
Israeli Office Action for IL Patent Application No. 263016, dated Nov. 14, 2022 with partial English translation.
Korean Office Action for KR Patent Application No. 10-2018-7032624, dated Dec. 21, 2022 with English translation.
Australian Office Action for corresponding AU Patent Application No. 2017275531 dated Mar. 27, 2023.
European Interlocutory decision of the opposition division for corresponding EP Patent Application No. 3462938 dated Mar. 29, 2023.
Substantive Examination Clear Report, dated Jun. 14, 2023, issued in corresponding Malaysian Patent Application No. PI 2018703371.
Indian Office Action dated Oct. 16, 2023 for corresponding Indian Application No. 201817034852.
Israeli Office Action for IL Patent Application No. 263016, dated Oct. 21, 2021, with English translation.
Japanese Decision to Grant a Patent for JP Application 2018-562072 dated Dec. 20, 2021, with English translation (3 pages).

* cited by examiner

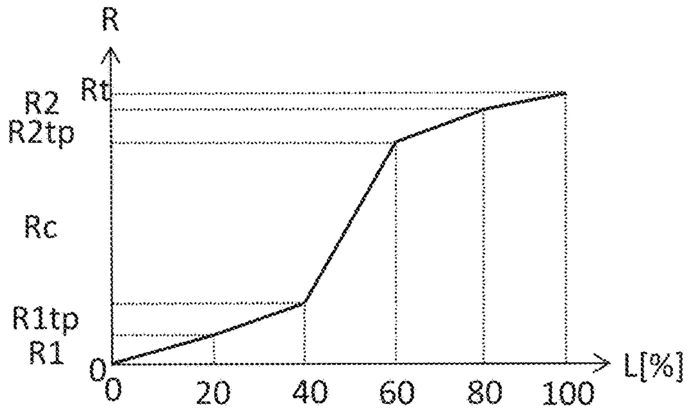
Fig. 1
Fig. 2
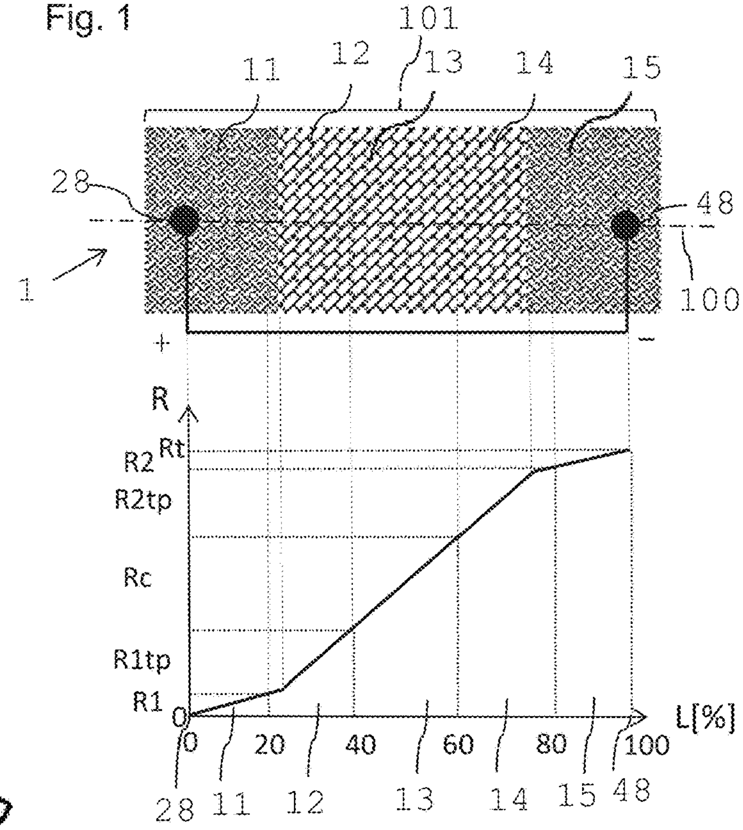
Fig. 2a
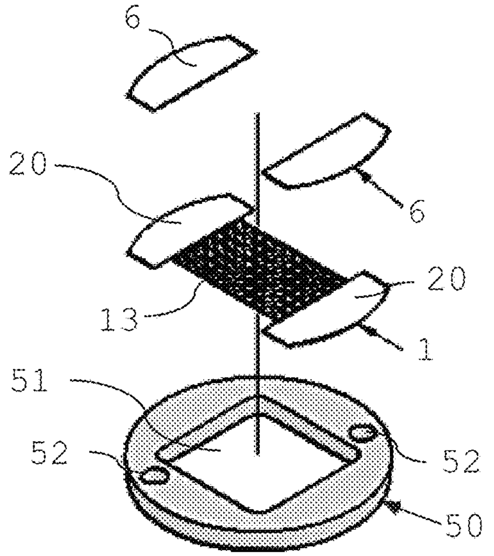
Fig. 3
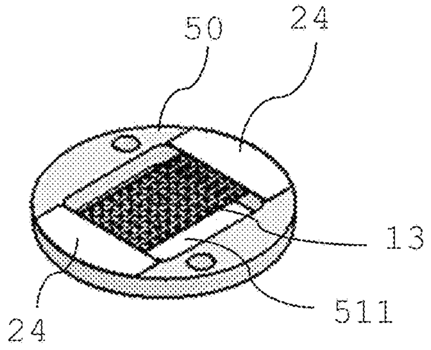
Fig. 4

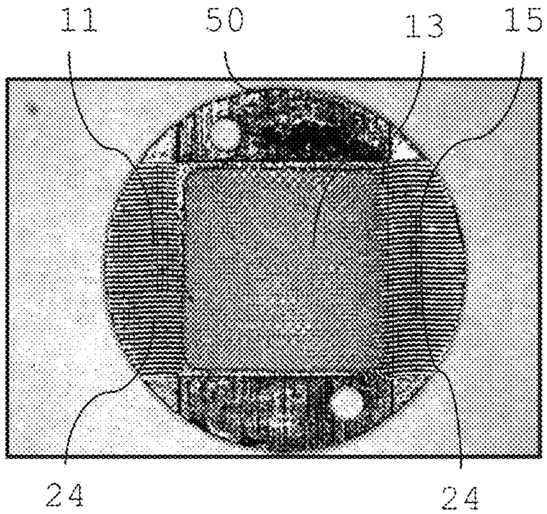
Fig. 5
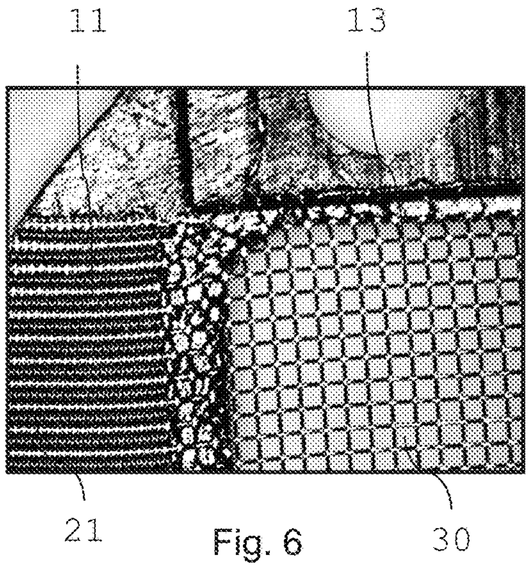
Fig. 6
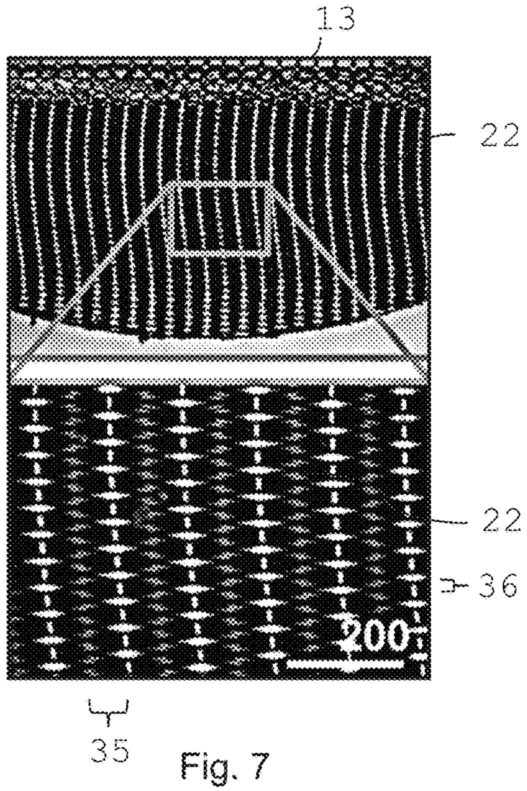
Fig. 7
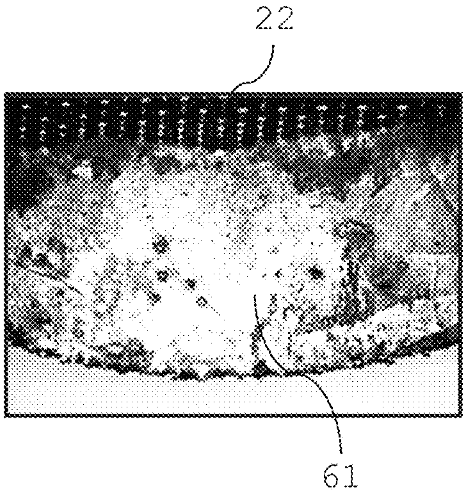
Fig. 8
Fig. 9
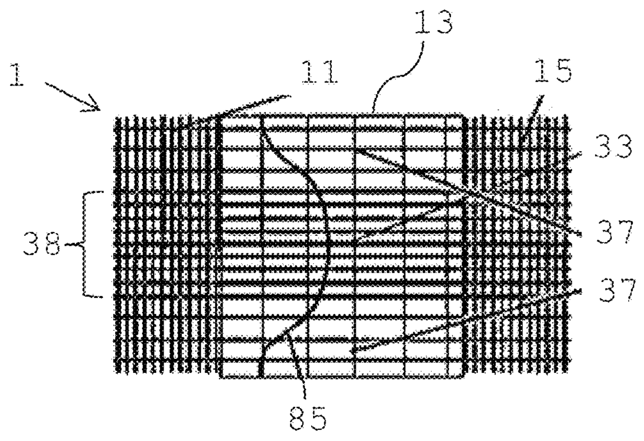

FLUID PERMEABLE HEATER ASSEMBLY FOR AEROSOL-GENERATING SYSTEMS

CROSS-REFERENCE TO RELATED APPLICATIONS

This application is a continuation of, and claims priority to, international application No. PCT/EP2017/062257, filed on May 22, 2017, and further claims priority under 35 U.S.C. § 119 to European Patent Application No. 16172198.0, filed May 31, 2016, the entire contents of each of which are incorporated herein by reference.

BACKGROUND

Field

Example embodiment relate to fluid permeable heater assemblies for aerosol-generating systems. At least some example embodiments relate to flat fluid permeable heater assemblies comprising a flat filament arrangement.

SUMMARY

At least one example embodiment relates to a fluid permeable heater assembly for an aerosol-generating system.

In at least one example embodiment, a fluid permeable heater assembly for aerosol-generating systems includes an electrically conductive flat filament arrangement, a first contact point, and a second contact point. The first contact point and the second contact point are configured to electrically contact the flat filament arrangement. A longitudinal axis is defined between the first contact point and the second contact point. A center resistance Rc is the electrical resistance between two points situated on the longitudinal axis. One of the two points is situated at a distance from the first contact point equal to about 40 percent of the distance between the first and the second contact point, and the other one of the two points is situated at a distance from the first contact point equal to about 60 percent of the distance between the first and the second contact point. A first resistance R1 is an electrical resistance between the first contact point and a point situated on the longitudinal axis at a distance from the first contact point equal to about 20 percent of the distance between the first and the second contact point. A second resistance R2 is an electrical resistance between the second contact point and a point situated on the longitudinal axis at a distance from the first contact point equal to about 80 percent of the distance between the first and the second contact point. A ratio of the center resistance to the first resistance Rc/R1 ranges from about 2 to about 400, and a ratio of the center resistance to the second resistance Rc/R2 ranges from about 2 to about 400.

In at least one example embodiment, a total resistance Rt corresponds to the electrical resistance between the first contact point and the second contact point. A ratio of the center resistance to the total resistance Rc/Rt corresponds to at least about 0.5, a ratio of the first resistance to the total resistance R1/Rt ranges from about 0.005 to about 0.125, and a ratio of the second resistance to the total resistance R2/Rt ranges from about 0.005 to about 0.125.

In at least one example embodiment, a first transition resistance R1*tp* corresponds to the electrical resistance between two points situated on the longitudinal axis. One of the two points is situated at a distance from the first contact point equal to about 20 percent and the other one of the two points being situated at a distance from the first contact point equal to about 40 percent of the distance between the first and the second contact point. A second transition resistance R2*tp* corresponds to the electrical resistance between two points situated on the longitudinal axis. One of the two points is situated at a distance from the first contact point equal to about 60 percent and the other one of the two points being situated at a distance from the first contact point equal to about 80 percent of the distance between the first and the second contact point. A ratio of the first transition resistance to the first resistance R1*tp*/R1 ranges from about 1.1 to about 400. A ratio of the second transition resistance to the second resistance R2*tp*/R2 ranges from about 1.1 to about 400. A ratio of the center resistance to the first transition resistance Rc/R1*tp* ranges from about 1.1 to about 400. A ratio of the center resistance to the second transition resistance Rc/R2*tp* ranges from about 1.1 to about 400.

In at least one example embodiment, a total resistance Rt corresponds to the electrical resistance between the first contact point and the second contact point ranges from about 0.5 Ohm to about 4 Ohm. The center resistance Rc is higher than about 0.5 Ohm. The first resistance R1 and the second resistance R2 are each lower than about 100 mOhm.

In at least one example embodiment, a central longitudinal region extends from the first contact point to the second contact point. An electrical resistance in the central longitudinal region is lower than an electrical resistance outside of the central longitudinal region.

In at least one example embodiment, the electrically conductive flat filament arrangement is a perforated sheet including a center surface, a first side surface, and a second side surface of the perforated sheet. The center surface includes a plurality of heater filaments. The first side surface includes the first contact point. The second side surface includes the second contact point. The first side surface and the second side surface each include a plurality of openings. The first and second side surfaces are arranged on opposite sides of the center surface.

In at least one example embodiment, the electrically conductive flat filament arrangement is a mesh including a center surface, a first side surface, and a second side surface. The first side surface includes the first contact point, and the second side surface includes the second contact point. A mesh of a center surface and meshes of first and second side surfaces each have a mesh density. The mesh density in the center surface is lower than the mesh density in each of the first side surface and the second side surface. The first side surface and the second side surface are arranged on opposite sides of the center surface. In at least one example embodiment, a mesh density gradient is established between the first side surface and the center surface, and between the center surface and the second side surface. In at least one example embodiment, the mesh of each of the first side surface and the second side surface has a weft aperture larger than zero and no warp aperture. In at least one example embodiment, in a weaving direction of the filament arrangement, a same number of filaments are arranged next to each other in the center surface and in the first side surface and the second side surface. In at least one example embodiment, in a weaving direction of the filament arrangement more filaments are arranged in a central longitudinal region than outside the central longitudinal region.

In at least one example embodiment, the fluid permeable heater assembly further comprises a substrate defining an opening through the substrate. The electrically conductive flat filament arrangement extends over the opening in the substrate. In at least one example embodiment, the fluid permeable heater assembly also includes a fastener attaching the flat filament arrangement to the substrate.

In at least one example embodiment, the fastener is electrically conductive and is an electrical contact configured to provide heating current through the filament arrangement. In at least one example embodiment, the fastener is a mechanical fastener. In at least one example embodiment, the mechanical fastener includes at least one of a clamp, a screw, and a form-locking fastener.

At least one example embodiment relates to an electrically operated aerosol-generating system.

In at least one example embodiment, an electrically operated aerosol-generating system includes an aerosol-generating device, a cartridge, and a fluid permeable heater assembly. The aerosol-generating device includes a main body defining a cavity, an electrical power source, and electrical contacts. The cartridge is configured to contain a liquid aerosol-forming substrate. The cartridge configured to be inserted in the cavity. The cartridge includes a housing having an opening. The heater assembly extends across the opening of the housing of the cartridge. The electrical contacts are configured to connect the electrical power source to the fluid permeable heater assembly.

BRIEF DESCRIPTION OF THE DRAWINGS

Examples embodiments are illustrated by means of the following drawings.

FIG. 1 is a schematic illustration of resistance distribution over a heater assembly according to at least one example embodiment.

FIG. 2 is a schematic illustration of mesh arrangement according to at least one example embodiment.

FIG. 2*a* is a schematic illustration of a resistance distribution of the mesh arrangement of FIG. 2 according to at least one example embodiment.

FIG. 3 is an exploded view of a heater assembly with mesh arrangement according to at least one example embodiment.

FIG. 4 is an illustration of the assembled heater assembly of FIG. 3 according to at least one example embodiment.

FIG. 5 is an illustration of a heater substrate with mesh arrangement according to at least one example embodiment.

FIG. 6 is an enlarged view of FIG. 5 according to at least one example embodiment.

FIG. 7 is an enlarged view of transition and contact regions of a mesh arrangement according to at least one example embodiment.

FIG. 8 is an illustration of a tin-plated contact region of a mesh heater according to at least one example embodiment.

FIG. 9 is a schematic illustration of a mesh arrangement according to at least one example embodiment.

DETAILED DESCRIPTION

Example embodiments will become more readily understood by reference to the following detailed description of the accompanying drawings. Example embodiments may, however, be embodied in many different forms and should not be construed as being limited to the example embodiments set forth herein. Rather, these example embodiments are provided so that this disclosure will be thorough and complete. Like reference numerals refer to like elements throughout the specification.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings set forth herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these example embodiments should not be construed as limited to the particular shapes of regions illustrated herein, but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of this disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In the following description, illustrative embodiments may be described with reference to acts and symbolic representations of operations (e.g., in the form of flow charts, flow diagrams, data flow diagrams, structure diagrams, block diagrams, etc.) that may be implemented as program modules or functional processes including routines, programs, objects, components, data structures, etc., that perform particular tasks or implement particular abstract data types. The operations be implemented using existing hardware in existing electronic systems, such as one or more microprocessors, Central Processing Units (CPUs), digital signal processors (DSPs), application-specific-integrated-circuits (ASICs), SoCs, field programmable gate arrays (FPGAs), computers, or the like.

Further, one or more example embodiments may be (or include) hardware, firmware, hardware executing software, or any combination thereof. Such hardware may include one or more microprocessors, CPUs, SoCs, DSPs, ASICs, FPGAs, computers, or the like, configured as special purpose machines to perform the functions described herein as well as any other well-known functions of these elements. In at least some cases, CPUs, SoCs, DSPs, ASICs and FPGAs may generally be referred to as processing circuits, processors and/or microprocessors.

Although processes may be described with regard to sequential operations, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium," may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, at least some portions of example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, processor(s), processing circuit(s), or processing unit(s) may be programmed to perform the necessary tasks, thereby being transformed into special purpose processor(s) or computer(s).

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

At least one example embodiment relates to a fluid permeable heater assembly for aerosol-generating systems. The fluid permeable heater assembly comprises an electrically conductive flat filament arrangement and a first contact point and a second contact point configured to electrically contact the flat filament arrangement and connect the flat filament arrangement to an external power source. A longitudinal axis is defined between the first contact point and the second contact point. In the heater assembly, a center resistance Rc is the electrical resistance between two points situated on the longitudinal axis, one of the two points is situated at a distance from the first contact point equal to about 40 percent and the other one of the two points being situated at a distance from the first contact point equal to about 60 percent of the distance between the first and the second contact point. A first resistance R1 is an electrical resistance between the first contact point and a point situated on the longitudinal axis at a distance from the first contact point equal to about 20 percent of the distance between the first and the second contact point. A second resistance R2 is an electrical resistance between the second contact point and a point situated on the longitudinal axis at a distance from the first contact point equal to about 80 percent of the distance between the first and the second contact point. A ratio of the center resistance to the first resistance Rc/R1 ranges from about 2 to about 400, and a ratio of the center resistance to the second resistance Rc/R2 ranges from about 2 to about 400.

In at least one example embodiment, the ratio of the center resistance to the first resistance Rc/R1 ranges from about 2 to about 300, or from about 40 to about 200.

In at least one example embodiment, the ratio of the center resistance to the second resistance Rc/R2 ranges from about 2 to about 300, or from about 40 to about 200.

The heater assembly comprises a total resistance Rt corresponding to the electrical resistance between the first contact point and the second contact point.

In at least one example embodiment, a ratio of the center resistance to the total resistance Rc/Rt corresponds to at least about 0.3, at least about 0.4, about least about 0.5, at least about 0.6, or at least about 0.7.

In at least one example embodiment, a ratio of the first resistance to the total resistance R1/Rt ranges from about 0.005 to about 0.125, or above 0.01. In at least one example embodiment, a ratio of the first resistance to the total resistance R1/Rt ranges from about 0.01 to about 0.1, or from about 0.05 to about 0.1.

In at least one example embodiment, a ratio of the second resistance to the total resistance R2/Rt ranges from about 0.005 to about 0.125, or is above about 0.01. In at least one example embodiment, a ratio of the second resistance to the total resistance R2/Rt ranges from about 0.01 to about 0.1, or from about 0.05 to about 0.1.

In at least one example embodiment, the center resistance Rc corresponds to at least about 50 percent of a total electrical resistance Rt of the heater assembly between the first and second contact points. In at least one example embodiment, the first and second resistance each correspond to a maximum of about 13 percent of the total electrical resistance and to a minimum of about 0.5 percent of the total electrical resistance Rt.

The center resistance Rc may correspond up to about 99 percent of the total resistance Rt. In at least one example embodiment, the center resistance corresponds to about 80 percent to about 98 percent, or to about 90 percent to about 95 percent of the total resistance Rt. Such high electrical resistance in one selected region of the filament arrangement allows targeted resistive heating of the filaments in this heating region and efficient evaporation of an aerosol-forming fluid to be evaporated.

As used herein, the term "about" is used in connection with a particular value throughout this application this is to be understood such that the value following the term "about" does not have to be exactly the particular value due to technical considerations. However, the term "about" used in connection with a particular value is always to be understood to include and also to explicitly disclose the particular value following the term "about"

Regions next to and between the first and second contact points comprising the relatively low first and second resistance R1, R2 define electrical contact regions of the heater assembly. The contact regions are designed to not, or not substantially, transform current flowing through the contact regions of the filament arrangement into heat. A central region between the first and second contact point comprising the relatively high center resistance defines a heating region of the heater assembly.

The ratio of electrical resistance between center resistance and first and second resistance in the ranges defined above, in particular, a low electrical resistance close to the first and second contact points may correspond to a maximum of about 13 percent each of the total electrical resistance and at the same time to a minimum of about 0.5 percent of the total electrical resistance.

The low electrical resistance close to the contact points is much smaller than the electrical resistance of the heating region. The electrical resistance close to the contact points may also have a defined minimum.

A low electrical resistance close to the contact points may positively influence an electrical contact of the heater assembly compared to heater assemblies comprising filament arrangements comprising meshes having low mesh densities. In at least one example embodiment, the low electrical resistance provides good transport of a heating current to the more centrally arranged heating region, where heating is desired. In at least one example embodiment, having a specific ratio of center resistance to first and second resistance, in particular a minimum electrical resistance in contact regions may limit dissipation of heat from the heating region to the contact regions. By this, heat may be kept in a center surface of a heater assembly where evaporation takes place. Overall power consumption of a heater or a respective aerosol-generating device may be limited. In at least one example embodiment, any possibly present overmoulding material in contact regions, typically a polymer material, is less affected by heat.

This variability in resistance distribution in a heater assembly, for example by selection of specific material, sizes or structure of a heating region and contact regions allow to vary, in particular enlarge, a total size of a filament arrangement, however, without varying too much, in particular enlarging a heating region. This may be required or desired in order to not impose excessive demands to a power system of an aerosol-generating device.

The heater assembly may have a total resistance Rt ranging from about 0.5 Ohm to about 4 Ohm, ranging from about 0.8 Ohm to about 3 Ohm, or of about 2.5 Ohm.

In at least one example embodiment, the center resistance Rc is higher than about 0.5 Ohm, higher than about 1 Ohm, or about 2 Ohm.

In at least one example embodiment, the first resistance R1 is lower than about 100 mOhm, than about 50 mOhm, or ranges from about 5 mOhm to about 25 mOhm. In at least one example embodiment, the first resistance is higher than about 3 mOhm, or higher than about 5 mOhm.

In at least one example embodiment, the second resistance R2 is lower than about 100 mOhm, lower than about 50 mOhm, or ranges from about 5 mOhm to about 25 mOhm. In at least one example embodiment, the second resistance is higher than about 3 mOhm, or higher than about 5 mOhm.

Throughout this application, whenever a value is mentioned, this is to be understood such that the value is explicitly disclosed. However, a value is also to be understood as not having to be exactly the particular value due to technical considerations.

Resistance of the heater assembly according at least one example embodiment is different to, for example, prior art heater assemblies comprising mesh filaments, where a homogenous mesh with a same mesh density over the entire filament arrangement is mounted to a heater assembly or where a filament arrangement is comprised of a mesh with two side metal plates as contacts. The resistance in contact regions is higher than when using metal plates as contacts, but may be the same or higher in a heating region, depending on, for example, a material or a filament construction used for the central heating region.

Due to the defined low electrical resistance close to the contact points, a resistance over the heater assembly may be optimized in view of contacting and heating of the filament arrangement as well as in view of assembly and use of a heater assembly.

A value of a center resistance of a heater assembly may be defined and chosen according to a desired (or, alternatively predetermined) evaporation result or, for example, according to parameters of a heater assembly or of an aerosol-generating device the heater assembly is to be used with. In at least one example embodiment, the value of the center resistance may be chosen according to a liquid to be evaporated (viscosity, evaporation temperature, amount of evaporated substance etc.).

In at least one example embodiment, the arrangement and electrical resistance of a heating region is provided and adapted for a liquid to be efficiently heated and evaporated by the filaments of a center surface of the filament arrangement.

In at least one example embodiment, the arrangement and electrical resistance of contact regions of a heater assembly or of a first and a second side surface of a filament arrangement is provided and configured for good electrical contact of the filament arrangement to an external power source. The contact regions are also configured for a desired (e.g., optimal) interplay with the heating region or a center surface of a filament arrangement, respectively.

The heater assembly according at least one example embodiment may further comprise a first transition resistance R1*tp* corresponding to the electrical resistance between two points situated on the longitudinal axis, one of the two points being situated at a distance from the first contact point equal to 20 percent and the other one of the two points being situated at a distance from the first contact point equal to 40 percent of the distance between the first and the second contact point. The heater assembly may further comprise a second transition resistance R2*tp* corresponding to the electrical resistance between two points situated on the longitudinal axis, one of the two points being situated at a distance from the first contact point equal to about 60 percent and the other one of the two points being situated at a distance from the first contact point equal to about 80 percent of the distance between the first and the second contact point. A ratio of the first transition resistance to the first resistance R1*tp*/R1 ranges from about 1.1 to about 400, a ratio of the second transition resistance to the second resistance R2*tp*/R2 ranges from about 1.1 to about 400, a ratio of the center resistance to the first transition resistance Rc/R1*tp* ranges from about 1.1 to about 400, and a ratio of the center resistance to the second transition resistance Rc/R2*tp* ranges from about 1.1 to about 400.

In at least one example embodiment, the ratios R1*tp*/R1, R2*tp*/R2, Rc/R1*tp* and Rc/R2*tp* range from about 2 to about 300 or from about 40 to about 200.

A first transition surface of the filament arrangement comprising the first transition resistance R1*tp* is between the first side surface and the center surface of the filament arrangement or heater assembly, respectively. A second transition surface of the filament arrangement comprising the second transition resistance R2*tp* is between the second side surface and the center surface. Each transition surface comprises an electrical resistance substantially ranging from the first or second resistance of the corresponding first or second side surface to the center resistance of the center surface.

By the provision of a transition electrical resistance, for example by the provision of a gradient in the electrical resistance, a smooth transition of power distribution over the heater assembly and respective heating may be achieved.

In at least one example embodiment, a transition resistance is closer to the first or second resistance than the center resistance.

The first and second transition resistance extend over about 20 percent of the longitudinal axis between the first and the second contact point of the heater assembly.

The term 'flat' heater assembly or 'flat' filament arrangement is used throughout the specification to refer to a filament arrangement or a flat heater assembly that is in the form of a substantially two dimensional topological manifold. Thus, the flat filament arrangement and flat heater assembly extend in two dimensions along a surface substantially more than in a third dimension. In at least one example embodiment, the dimensions of the flat filament arrangement in the two dimensions within the surface is at least about 5 times larger than in the third dimension, normal to the surface. An example of a flat filament arrangement and a flat heater assembly is a structure between two substantially parallel imaginary surfaces, wherein the distance between these two imaginary surfaces is substantially smaller than the extension within the surfaces. In some example embodiments, the flat filament arrangement is planar and the flat heater assembly is substantially planar. In other example embodiments, the flat filament arrangement and the flat heater assembly is curved along one or more dimensions, for example forming a dome shape or bridge shape.

A flat filament arrangement may be used in a flat heating element, which can be easily handled during manufacture and provides for a robust construction.

The term 'filament' is used throughout the specification to refer to an electrical path arranged between two electrical contacts. A filament may arbitrarily branch off and diverge into several paths or filaments, respectively, or may converge from several electrical paths into one path. A filament may have a round, square, flat or any other form of cross-section. A filament may be arranged in a straight or curved manner.

The term 'filament arrangement' is used throughout the specification to refer to an arrangement of one or a plurality of filaments. The filament arrangement may be an array of filaments, for example arranged parallel to each other. The filaments may form a mesh. The mesh may be woven or non-woven. The filament arrangement has a thickness ranging from about 0.5 micrometers to about 500 micrometers. The filament arrangement may, for example, be in the form of an array of parallel or crosswise electrically conductive filaments. The filament may be integrally formed with electrical contacts, for example formed from an electrically conductive foil, for example, stainless steel foil, that is etched to define the filaments or openings in a center surface as well as in side surfaces.

A center surface of a filament arrangement is always arranged in between a first and a second side surface of the filament arrangement. The center surface is arranged in the geometric middle between the first and the second side surfaces. In a filament arrangement having a longitudinal extension larger than a transverse extension such as, for example a rectangular shaped filament arrangement, the center surface as well as the side surfaces may also have a longitudinal or rectangular shape.

An electrical resistance in the first and the second side surface of a filament arrangement may be selected according to a heating regime through the filament arrangement or according to the way of contacting the filament arrangement to a heater substrate or contacting the heater assembly.

The first and second resistance may be distributed homogenously over each of the two side surfaces.

The first and second resistance may be distributed irregularly over each of the side surfaces. In at least one example embodiment, higher electrical resistance may be provided in edge regions and lower electrical resistance may be provided in a central region of a side surface.

First and second resistances may be identical or symmetric with respect to the center resistance. In at least one example embodiment, first and second resistances may be different. Depending on an arrangement of the filament arrangement in view of a voltage applied (the first or second contact point being connected to ground or to voltage), there may be slightly different local heating. Different electrical resistances, for example, different filament materials or filament densities in the first and the second side surface may be used to even out differences in heating and thus equilibrate temperature variation over a heater assembly. Consistent heating over an entire heating region of the filament arrangement may thus be supported.

The flat fluid permeable heater assembly, according to at least one example embodiment, may also comprise variations of the center resistance or of the first and second resistance, or of the center resistance and the first and second resistance relative to the longitudinal axis.

The heater assembly may, for example, comprise a central longitudinal region extending from the first contact point to the second contact point. An electrical resistance in the central longitudinal region is lower than an electrical resistance outside of the central longitudinal region.

In at least one example embodiment, fewer or smaller filaments may be arranged in edge regions along the filament arrangement than in the central longitudinal region. In at least one example embodiment, a mesh density may be higher in the central longitudinal region than in lateral longitudinal regions along the filament arrangement. By this, a power distribution may be concentrated onto a central region of a central surface. Such a specific power distribution may be realized by a flat filament arrangement, wherein in the direction of the longitudinal axis more filaments are arranged in the central longitudinal region than outside the central longitudinal region.

The electrical resistance may be defined and varied by the selection of the material used for the filament arrangement or by the size and arrangement of filaments in the filaments arrangement. In at least one example embodiment, the electrical resistance is, by a pre-selected filament material, defined by a ratio of open area to the total area of the filament arrangement.

In at least one example embodiment, the fluid permeable heater assembly may comprise an electrically conductive flat filament arrangement, and a first contact point and a second contact point for electrically contacting the flat filament arrangement. A longitudinal axis is defined between the first contact point and the second contact point. In the heater assembly, a center surface Sc is an area of the heater assembly extending between two lines lying perpendicular to the longitudinal axis and crossing the longitudinal axis at two points arranged on the longitudinal axis, one of the two points being situated at a distance from the first contact point equal to 40 percent and the other one of the two points being situated at a distance from the first contact point equal to 60 percent of the distance between the first and the second contact point. A first side surface S1 is an area of the heater assembly extending between two lines lying perpendicular to the longitudinal axis and crossing the longitudinal axis at the first contact point and a point arranged on the longitudinal axis and situated at a distance from the first contact point equal to 20 percent of the distance between the first and the second contact point. A second side surface S2 is an area of the heater assembly between two lines lying perpendicular to the longitudinal axis and crossing the longitudinal axis at the second contact point and a point arranged on the longitudinal axis and situated at a distance from the first contact point equal to 80 percent of the distance between the first and the second contact point.

The center surface Sc comprises a plurality of openings defining an open area ScOA, the first side surface S1 comprises a plurality of openings defining an open area S1OA, and the second side surface S2 comprises a plurality of openings defining an open area S2OA. A ratio of the open area of the center surface to the open area of the first side surface ScOA/S1OA ranges from about 1.1 to about 30, and a ratio of the open area of the center surface to the open area of the second side surface ScOA/S2OA ranges from about 1.1 to about 30. In at least one example embodiment, the ratio of the open area of the center surface to the first side surface or to the second side surface, ScOA/S1OA, or ScOA/S2OA range from about 2 to about 28, from about 2 to about 15, or from about 15 to about 28.

The open area of the center surface ScOA may range from about 40 percent to about 90 percent of the total area of the center surface. In at least one example embodiment, the open area in the center surface ranges from about 50 percent to about 80 percent, or from about 50 to about 70 percent.

A heater assembly may have a constant width along the length of the longitudinal axis with respect to the filament arrangement.

A heater assembly may have a varying width along the length of the longitudinal axis. When the heater assembly has a varying width along the length, for the purpose of calculating the open areas, the heater assembly is considered to be the rectangular area between two lines parallel to the longitudinal axis passing through points of the filament arrangement which are the most distant to the longitudinal axis. By this, the absence of filament arrangement in narrower parts of the heater assembly is counted as open area.

Most of the heating may happen in a central surface of the heater assembly between the two contact points. Little heating may happen in the side surfaces.

The open area of the center surface is formed by a plurality of openings, which has a size and distribution configured for a fluid to be vaporized to penetrate into the openings and allow an as direct and efficient heating of the fluid.

An open area of each side surface is smaller than the open area of the center surface. In at least one example embodiment, the open area of the first side surface is not larger than about 10 percent of the total area of the first side surface and the open area of the second side surface is also not larger than about 10 percent of the total area of the second side surface. The open area of the side surfaces may each be in a range of from about 5 to about 35 percent, from about 5 to about 20 percent, or from about 5 to about 15 percent of the total area of a side surface.

Small or little open area in side surfaces may enhance an electrical contact in these side surfaces compared to, for example, meshes having low densities.

In addition, a plurality of openings in side surfaces may limit leakage of liquid out of the heater assembly. Liquid is supplied from a liquid storage reservoir, such as a tank system or cartridge to the heater assembly. The liquid penetrates into the plurality of openings in the center surface where the liquid may be heated and vaporized.

Liquid tends may pass between a heater substrate and contact portions radially outwardly of the heater by capillary forces. This effect may be substantial when using foils as contact portions.

By providing a plurality of openings in the side surfaces, the liquid may enter into the openings and thus be kept in the side surfaces.

In at least one example embodiment, an overmoulding of contact portions is facilitated. Overmoulding is typically used for stability purposes of contact portions, such as when using thin contact foils or loose meshes. Side surfaces may be overmoulded with a heat resistive polymer. Overmoulding may reduce and/or substantially prevent displacement of individual filaments, or an unravelling of filament edges. With an overmoulding of side surfaces or entire contact portions stability of the side surfaces may be enhanced. This may facilitate mounting of the filament arrangements when assembling a heater assembly. It may also facilitate keeping a form and shape of the filament arrangement. Reproducibility and reliability of heaters using a filament arrangement may thus be improved.

An overmoulding material may be any material suitable for use in a fluid permeable heater according to at least one example embodiment. An overmoulding material may be a material that is able to tolerate high temperatures (in excess of about 300 degree Celsius), such as polyimide or thermoplastics such as for example polyetheretherketone (PEEK).

In the filament arrangement, the overmoulding material may penetrate into the openings in the first and second side surfaces. The openings may form microchannels in the filament arrangement. Thus, a connection between the material of the filament arrangement and the overmoulding material may be enhanced. The low value of open area, in particular small sized openings, may additionally support that the overmoulding material is kept in the side surfaces and does not flow through.

With the filament arrangement provided with a plurality of openings, leakage may be substantially prevented and/or reduced also with overmoulded side surfaces. Due to a surface of the overmoulded side surface not being flat, surface irregularities may serve as liquid retention.

A ratio of open areas or a value of an open area in the center surface of a filament arrangement or the number, sizes and arrangement of the openings of the plurality of openings in the center surface may be chosen according to a liquid to be evaporated (e.g., viscosity, evaporation temperature, amount of evaporated substance etc.).

A ratio of open areas or a value of an open area in the first and second side surface of a filament arrangement may be selected according to a heating regime through the filament arrangement or according to the way of contacting the filament arrangement to a heater substrate or contacting the heater assembly. The value of an open area in the two side surfaces may also be selected according to an overmoulding material used (flow speed, temperature during overmoulding etc.).

The plurality of openings in the side surfaces may be arranged homogenously and regularly over each of the two side surfaces.

The plurality of openings in the side surfaces may be arranged irregularly over each of the side surfaces. In at least one example embodiment, more or larger openings may be provided in edge regions and smaller or fewer openings may be provided in a central region of the side surface.

Amount and distribution of openings in the two side surfaces may be identical or symmetric with respect to the center surface. In at least one example embodiment, amount and distribution of openings in the two side surfaces may be different in the two side surfaces to even out differences in heating due to a specific power application to the filament arrangement.

A transition surface arranged between a side surface and the center surface may comprise an open area gradient ranging from an open area of a side surface to an open area of the center surface.

The flat filament arrangement may be a perforated sheet. The center surface of the perforated sheet may comprise a plurality of heater filaments separated or distanced from each other by a plurality of openings. The side surfaces of the perforated sheet may each comprise a plurality of openings.

The openings may be manufactured by chemical etching or laser treatment.

The flat filament arrangement may be a mesh arrangement, wherein a mesh of the center surface and meshes of the first and second side surface each comprise a mesh density. The mesh density in the center surface is lower than the mesh density in each of the first and second side surface. Thus, the electrical resistance is lower in the two side surfaces than in the center surface. Interstices between filaments of the meshes define the open area of the center surface and the open areas of each of the first and second side surface.

Mesh arrangements may be manufactured by applying different weaving modes to manufacture the different surface of the mesh. By this, a single strip or a continuous band of mesh may be manufactured having different density meshes in the side surfaces and the center surface. A continuously produced band of mesh may be cut to appropriately sized strips of mesh.

The filament arrangement may be manufactured at low cost, in a reliable and repeatable manner. The filament arrangement may be manufactured in one manufacturing step, not requiring assembly of individual filament arrangement parts.

In a mesh arrangement, a mesh density gradient corresponding to an electrical resistance gradient may be located between the first side surface and the center surface and between the center surface and the second side surface. These mesh gradients may represent transition surfaces between center surface and side surfaces.

The mesh of the center surface may comprise a weft aperture having a same size than a warp aperture of the mesh of the center surface. By this a mesh having regular square-shaped openings in the center surface may be manufactured.

The meshes of the first and the second side surface may comprise a weft aperture larger than zero and no warp aperture. By this, very small, regularly arranged openings in the meshes of the two side surfaces may be manufactured.

In at least one example embodiment, in weaving direction of the filament arrangement a same number of (warp) filaments are arranged next to each other along the entire length of the filament arrangement. In these embodiments, continuing warp filaments extend at least from a first side surface to the second side surface, and along the entire length of the filament arrangement. By this method, mesh arrangements may be manufactured, wherein a warp aperture in the two side surfaces is equal to the warp aperture of the center surface.

In at least one example embodiment, the filament arrangement is a mesh arrangement.

For the filaments of the filament arrangement any electrically conductive material suitable for manufacturing a filament arrangement and for being heated may be used.

In at least one example embodiment, materials for the filament arrangement are metals, including metal alloys, and carbon fibers. Carbon fibers may be added to metals or other carrier material to vary the resistance of the filaments.

Filament diameters may range from about 8 micrometers to about 50 micrometers, from about 10 micrometers to about 30 micrometers, or from about 12 micrometers to about 20 micrometers. In at least one example embodiment, the filament diameter may be about 16 micrometers.

Side surfaces made of mesh may be compressed so that electrical contact is made between individual filaments of the mesh. Thus, contact with the filament arrangement may be improved.

Sizes of openings in the center surface may have a length and width or diameter ranging from about 25 micrometers to about 75 micrometers. In at least one example embodiment, sizes of openings in the center surface may have a length and width or diameter ranging from about 60 micrometers to about 80 micrometers.

Sizes of openings in the side surfaces may have a length and a width ranging from about 0.5 micrometer to about 75 micrometers. In at least one example embodiment, sizes of openings in side surfaces have a width up to about 75 micrometers, when a length decreases to about 0.5 micrometer. In at least one example embodiment, sizes of openings in side surfaces have diameters ranging from about 5 micrometers to about 50 micrometers or corresponding opening areas.

The center surface of the flat filament arrangement may have a size in a range of about 5 $mm^2$ to about 35 $mm^2$ or about 10 $mm^2$ to about 30 $mm^2$, for example about 25 $mm^2$. In at least one example embodiment, a center surface has a rectangular or substantially square form, and a size of about 5×5 $mm^2$. Heat dissipation may be kept low in surfaces having about a same length and width.

A side surface may have a size in a range of about 3 $mm^2$ to about 15 $mm^2$ or about 5 $mm^2$ to about 10 $mm^2$. In at least one example embodiment, the side surface may have a size of about 5 $mm^2$ or about 10 $mm^2$.

Depending on the position of contacts or contact points on the filament, the distance between the contact points may be equal to a total length of the filament arrangement. In at least one example embodiment, the distance between two contact points is shorter than the total length of the filament arrangement. In at least one example embodiment, the specification of the remaining longitudinal ends of the filament arrangement longitudinally extending beyond the contact points is equal or similar to the specifications of the side surfaces and as described herein. In at least one example embodiment, the longitudinal ends of the mesh filament comprise a resistance and open area as the side surfaces.

In at least one example embodiment, side surfaces have the form of strips, such as a rectangular strip of about 5×(1-2) $mm^2$.

The sizes of contact portions or side surfaces, respectively, may be adapted to provide good contact with connectors used to connect the heater assembly to a power supply, for example a contact with pogo pins.

A number of openings of the plurality of openings in the center surface may a range in number from about 5 to about 100 openings per $m^2$, about 15 to about 70 openings per $mm^2$, or about 40 openings per $mm^2$.

A number of openings of the plurality of openings in a side surface ray range from about 20 to about 400 openings per $mm^2$, from about 50 to about 350 openings per $mm^2$, or from about 300 to about 350 openings per $mm^2$.

A filament arrangement may be pretreated. Pretreatment may be a chemical or physical pretreatment, such as, changing the surface characteristic of the filament surface. In at least one example embodiment, a filament surface may be treated to enhance wettability of the filament, such as in a center surface or heating region only. Increased wettability may be useful for liquids (e-liquids) used in electronic vaporization devices. E-liquids may comprise an aerosol-former such as glycerol or propylene glycol. The liquids may additionally comprise flavourants or nicotine.

The aerosol-forming liquids evaporate may comprise at least one aerosol former and a liquid additive.

The aerosol-forming liquid may comprise water.

The liquid additive may be any one or a combination of a liquid flavour or liquid stimulating substance. Liquid flavour may comprise tobacco flavour, tobacco extract, fruit flavour, or coffee flavour. The liquid additive may be a sweet liquid such as for example vanilla, caramel and cocoa, a herbal liquid, a spicy liquid, or a stimulating liquid containing, for example, caffeine, taurine, nicotine or other stimulating agents known for use in the food industry.

In at least one example embodiment, the fluid permeable heater assembly comprises a substrate comprising an opening through the substrate. The electrically conductive flat filament arrangement extends over the opening in the substrate. The heater assembly further comprises fastener attaching the flat filament arrangement to the substrate.

The fastener may itself be electrically conductive and may serve as electrical contact for providing heating current through the filament arrangement.

The fastener may be chemical or mechanical fastener. The filament arrangement may be attached to the substrate by bonding or gluing.

In at least one example embodiment, the fastener is a mechanical fastener such as a clamp, a screw, or a form-locking fastener. Clamps and flat heater assemblies using clamps to clamp a filament arrangement to a heater substrate have been described in detail in the international patent publication WO2015/117701, the entire content of which is incorporated herein by reference thereto.

The fastener may be one or a combination of the aforementioned fastener.

In at least one example embodiment, the heater assembly is a flat heater assembly, such as a resistively heatable fluid permeable flat heater assembly.

At least one example embodiment relates to an electrically operated aerosol-generating system. In at least one example embodiment, the system comprises an aerosol-generating device and a cartridge comprising a liquid aerosol-forming substrate. The system further comprises a fluid permeable heater assembly according to the invention and as described herein for heating liquid aerosol-forming substrate. The cartridge comprises a housing having an opening, with the heater assembly extending across the opening of the housing of the cartridge. The aerosol-generating device comprises a main body defining a cavity for receiving the cartridge, an electrical power source, and electrical contacts for connecting the electrical power source to the heater assembly, that is, to the first and second contact points of the heater assembly, for heating the filament arrangement.

In at least one example embodiment, the cartridge comprises a liquid comprising at least an aerosol-former and a liquid additive.

In FIG. 1 a schematic illustration of an example of a resistance distribution along the longitudinal axis 100 of a heater assembly between a first contact point at position 0% and a second contact point at position 100% is shown. The vertical axis indicates the resistance (R) of the heater assembly up to a total resistance Rt of the heater assembly. The horizontal axis (L[%])) indicates the position on the longitudinal axis from the first contact point to the second contact point.

In at least one example embodiment, as shown in FIG. 1, the heater assembly comprises a first resistance R1 which is present over about 20 percent of the longitudinal axis starting at the first contact point at 0 into the direction of the second contact point. A first transition resistance R1*tp* is present from about 20 percent to about 40 percent of the longitudinal axis. A center resistance Rc is present from about 40 percent to about 60 percent of the longitudinal axis and after the first contact point. A second transition resistance R2*tp* is present from a point of about 60 percent to about 80 percent of the longitudinal axis after the first contact point. A second resistance is present from about 80 percent to about 100 percent, that is, over the last 20 percent of the heater assembly along the longitudinal axis between the first and second contact point.

The heater assembly is contacted in the first and the second contact points and a current is allowed to flow through the filament arrangement of the heater assembly.

The first resistance R1 may be up to a maximum of about 13 percent of the total resistance Rt and as low as about 0.5 percent of the total resistance Rt.

The first and second transition resistances R1_tp_, R2_tp_ are each not higher than the center resistance in order to substantially prevent and/or reduce extensive heating in a transition surface of a heater assembly. Typically, the first and second transition resistances R1_tp_, R2_tp_ have a value in between the first resistance R1 and the center resistance Rc or in between the center resistance Rc and the second resistance R2, respectively. The center resistance Rc is about 50 percent of the total resistance Rt of the heater assembly. In at least one example embodiment, the center resistance Rc is more than about 50 percent of the total resistance Rt. The second resistance may be up to a maxi of about 13 percent of the total resistance Rt and as low as about 0.5 percent of the total resistance Rt.

The first and second resistance R1, R2, the first and second transition resistance R1_tp_, R2_tp_ and the center resistance Rc add up to the total resistance Rt of the heater assembly.

In FIG. 2 a mesh arrangement 1 for a resistively heatable flat fluid permeable heater is shown. The mesh arrangement has a rectangular shape having a length 101 (Lf). The mesh filament may be contacted, for example by a pogo pin, in one spot as indicated by contact points 28, 48. Over the contact points 28, 48 a voltage is applied.

When arranged in a heater assembly and contacted in contact points 28, 48, areas of the filament arrangement define heater surfaces each extending over about 20 percent of the distance between the first contact point 28 and the second contact point 48.

A longitudinal axis 100 is defined between the first and second contact points 28, 48, which longitudinal axis corresponds to a central longitudinal axis of the filament arrangement 1. Along the longitudinal axis 100 the resistance of the heater surface is measured (see FIG. 1).

A first side surface 11 extends from the first contact point 28 over about 20 percent of the distance between first and second contact points 28, 48 along the longitudinal axis into the direction of the second contact point 48.

A first transition surface 12 extends from about 20 percent to about 40 percent of the distance between first and second contact points 28, 48 along the longitudinal axis.

A center surface 13 extends from about 40 percent to about 60 percent of the distance between first and second contact points 28, 48 along the longitudinal axis.

A second transition surface 14 extends from about 60 percent to about 80 percent of the distance between first and second contact point 28, 48 along the longitudinal axis.

A second side surface 15 extends from about 80 percent to about 100 percent of the distance between first and second contact points 28, 48 along the longitudinal axis counted from the first contact point 28 into the direction of the second contact point 48.

The center surface 13 comprises a low mesh density over its entire surface.

The first and second side surfaces 11, 15 comprise a high mesh density over their entire surface. The high mesh density has a higher mesh density than the low mesh density of the center surface 13.

The first and second transition surfaces 12, 14 comprise parts with a high mesh density and parts with a low mesh density. The high mesh density parts may have a density about the same as the high mesh density of the first and second side surfaces 11, 15. The low mesh density parts may have a low mesh density that is about the same as the low mesh density of the center surface 13.

The center surface 13 is designed to be the main heating region of the mesh arrangement.

In FIG. 2, all heater surfaces have a rectangular shape and the two side surfaces 11, 15 have a same size.

The meshes of the first and the second side surfaces 11, 15 have a higher density than the mesh of the central surface 13. In at least one example embodiment, the densities of the meshes of the side surfaces are identical. The mesh densities of the side surfaces may also be different, for example to compensate for a different size of the mesh filaments in these regions or for example to even out heating differences due to a flow direction of a current flowing through the mesh arrangement.

The meshes of the side surfaces 11, 15 have an open area formed by the sum of the interstices between the filaments of the meshes of less than about 20 percent of the total area of each of the first and second side surfaces. Thus, in the first and second side surfaces 11, 15 an open area is each about 1 $mm^2$, with a total size of each of the first and second side surfaces of about 4 $mm^2$ to about 5 $mm^2$.

The current flowing between the contact points 28, 48 causes resistive heating of the mesh filament in the center surface 13 and in the transition surfaces 12, 14 according to their higher resistance.

In FIG. 2_a_ a schematic resistance distribution of the mesh arrangement of FIG. 2 is shown.

In FIG. 2_a_ the resistance distribution is indicated along the longitudinal axis 100 between the first and the second contact points 28, 48.

In at least one example embodiment, the contact points 28, 48 are not arranged at the extreme ends of the filament arrangement. Thus, not the entire length 101 of the filament arrangement contributes to the resistance of a heater assembly comprising the filament arrangement.

The mesh arrangement of FIG. 2 does not have any transition portions with a mesh density gradient. Thus, the first transition resistance R1_tp_ is at first equal to the first resistance R1 in the side surface 11 and then equal to the center resistance Rc of the center surface 13. Accordingly, the second transition resistance R2_tp_ is at first equal to the center resistance Rc of the center surface 13 and then equal to the second resistance R2 of the second side surface 15 when seen in a direction from the first contact point 28 to the second contact point 48 along the longitudinal axis 100. Thus, a heating region of the mesh arrangement of FIG. 2 comprising a low mesh density and a high resistance extends over about 50 percent of the filament arrangement. The two side surfaces 12, 15 comprising a low mesh density and a low first and second resistance R1, R2 each extend over 20 percent of distance between the two contact points 28, 48.

FIG. 3 and FIG. 4 schematically show an example of a set-up of a flat, fluid-permeable heater assembly with a mesh arrangement. In the exploded view of the heater in FIG. 3 an electrically insulating substrate 50, a heater element and filament arrangement in the form of a mesh arrangement 1 and two metal sheets 6 are shown. The metal sheets may be sheets of tin, to alter electrical contact of connectors, such as contact pins, with the longitudinal ends 20 of the mesh arrangement 1.

The substrate 50 has the form of a circular disc and comprises a centrally arranged opening 51. The substrate comprises two bore holes 52 arranged diagonally opposite each other in the substrate. The bore holes 52 may serve for positioning and mounting the heater assembly for example in an aerosol-generating device.

The mesh arrangement 1 comprises a central surface 13 and two PEEK overmoulded longitudinal ends 20. The mesh arrangement is arranged over the square-shaped centrally arranged opening 51 and over the substrate 50. The entire central surface 13 of the mesh arrangement including those portions of the transition surfaces comprising a low mesh density come to lie over the opening 51. The two longitudinal ends 20, in particular those portions of the longitudinal ends overmoulded with PEEK and tin-plated (covered with the metal sheets 6) come to lie on the substrate 50.

The width of the mesh of the central surface 13 is smaller than the width of the opening 51 such that on both lateral sides of the central surface 13 an open portion 511 of the opening 51 is formed. The open portions 511 are not covered by mesh. The tin-plated dense mesh of the longitudinal ends forms a more plane contact area 24 than the mesh itself. The contact area 24 is arranged substantially parallel to the top surface of the substrate 50 of the heater assembly. The contact areas 24 are for contacting the heater assembly by an electrical connector from for example a battery.

FIG. 4 shows the heater assembly of FIG. 3 in an assembled state. The mesh arrangement 1 may be attached to the substrate 50 by mechanical means or for example by adhesive.

FIG. 5 shows a heater substrate 50 with a mesh arrangement 1 attached thereto. The mesh arrangement is a rectangular strip of mesh with a high density mesh in contact areas 24 of the heater assembly and a low density mesh in between defining the heating region of the heater assembly.

FIG. 6 is an enlarged view of a detail of FIG. 5. The low density mesh of the center surface 13 of the mesh arrangement has rectangular interstices 30 in a micrometer range, such as about 70 micrometers. With a wire diameter of the filaments of 16 micrometer, the open area of the center surface covers about 75 percent of the total area of the center surface.

The high density mesh of the side surface 11 of the mesh arrangement has smaller interstices 21 of about 0.1 micrometer×5 micrometers. With a filament diameter of about 16 micrometers, the open area of the side surfaces covers about 3 percent of the total area of each of the side surfaces.

The mesh arrangement has been produced in one piece by different weaving triodes.

The amount of filaments in a weaving direction is identical over the entire filament arrangement. The weaving direction corresponds to the warp direction of the filament arrangement, which warp direction corresponds to the main current flow direction in the mesh arrangement. However, the weaving density of the filaments in weft direction (perpendicular to the warp direction) is enhanced in the side surface 11. A distance between filaments in the weft direction may be reduced to zero in the side surfaces 11, 15.

Depending on the production mode, a transition in mesh density may be provided between center surface 13 and side surface 11, for example a density gradient in mesh density. In at least one example embodiment, such density gradient smoothly changes from the low density of the mesh of the center surface to the higher density of the mesh of the side surface and vice versa.

In FIG. 7 the higher density mesh in the side surface 22 has been compressed to improve electrical contact between the individual filaments of the mesh. A filament to filament distance between warp filaments 35 ranges from about 25 micrometers to about 75 micrometers, or about 70 micrometers. The filament to filament distance of weft filaments 36 is zero. The open area in the side surfaces is generated by the manufacturing of the filament arrangement through weaving.

To improve electrical contact of the longitudinal ends of the mesh arrangement, an outermost part of the compressed ends, at least partly including the side surface 22, is tin-plated 61 as may be seen in FIG. 8.

FIG. 9 shows a mesh arrangement 1 having a first side surface 13, an intermediate central surface 13 and an opposite second side surface 15. The mesh density in the two side surfaces 11, 15 is higher than the mesh density in the center surface 13. The mesh arrangement 1 comprises a longitudinal central portion 38 arranged along a longitudinal central axis 100 of the mesh arrangement 1. The mesh density in this longitudinal central portion 38 is higher than outside in lateral side regions 37 of the mesh arrangement. The longitudinal central portion 38 has a width of about 50% to about 60% of the total width of the mesh arrangement 1.

The higher mesh density in a central region 33 of the central surface leads to a high power density in this region and concentrates the main heating zone to this central region 33 of the center surface 13. Due to the different mesh densities in the different regions of the mesh arrangement, the highest power density is in the middle or central region 33 of the center surface 13. The lower density areas in the lateral regions 37 in the central surface 13 have comparably high resistance. The power density curve over the width of the central surface 13 is shown with line 85.

The side surfaces 11, 15 form part of high density mesh contact pads with comparably low resistance. In at least one example embodiment, the electrical contacts are arranged on the longitudinal axis in the side surfaces 11, 15, where an electrical resistance is lowest in the side surfaces.

The examples shown in the figures typically have symmetric side surfaces with a same size and a same mesh density or density distribution. Such example embodiments simplify a manufacturing and symmetric arrangement of a heater assembly. However, asymmetric mesh arrangement and mesh gradients may easily be provided to achieve a desired power distribution regime in the mesh filament.

Side surfaces of filament arrangements may be smaller or larger, have more and smaller or less and larger openings, be smaller and have higher mesh density or be larger and have lower mesh density, all in order to achieve a same or a specific resistance regime in the surfaces of the heater assembly. Such variations allow much flexibility in the application of the heater assembly. The heater assembly may be adapted to various liquids to be aerosolized, such as liquids that are more or less viscous fluids.

The filament arrangement may easily be adapted to differently sized heaters or to aerosol-generating devices having more or less power available for heating a heater assembly.

We claim:

1. A fluid permeable heater assembly for aerosol-generating systems, the fluid permeable heater assembly comprising:

an electrically conductive flat filament arrangement being a mesh and including, a center surface having a first mesh density, a first side surface having a second mesh density, the first side surface at least partially overmolded with a polymer configured to withstand temperatures of greater than 300° C., a second side surface having the second mesh density, the second side surface at least partially overmolded with the polymer, the first side surface and the second side surface spaced apart in a first direction, mesh density gradients between the first side surface and the center surface, and between the center surface and the second side surface, the mesh density gradients smoothly transitioning from the first mesh density to the second mesh density, a central longitudinal region extending from the first side surface to the second side surface, and an edge region extending through the center surface, the first side surface, and the second side surface, an electrical resistance in the central longitudinal region corresponding to the center surface being lower than an electrical resistance in the edge region corresponding to the center surface, the edge region having fewer filaments than the central longitudinal region, the edge region being adjacent to the central longitudinal region in a second direction different from the first direction;

a first contact point; and a second contact point, the first contact point and the second contact point configured to electrically contact the flat filament arrangement, a longitudinal axis being defined between the first contact point and the second contact point, a center resistance Rc being the electrical resistance between two points situated on the longitudinal axis, one of the two points being situated at a distance from the first contact point equal to 40 percent of the distance between the first and the second contact point, and the other one of the two points being situated at a distance from the first contact point equal to 60 percent of the distance between the first and the second contact point, a first resistance R1 is an electrical resistance between the first contact point and a point situated on the longitudinal axis at a distance from the first contact point equal to 20 percent of the distance between the first and the second contact point, a second resistance R2 is an electrical resistance between the second contact point and a point situated on the longitudinal axis at a distance from the first contact point equal to 80 percent of the distance between the first and the second contact point, a ratio of the center resistance to the first resistance Rc/R1 ranges from 2 to 400, and a ratio of the center resistance to the second resistance Rc/R2 ranges from 2 to 400.

2. The fluid permeable heater assembly according to claim 1, wherein a total resistance Rt corresponds to the electrical resistance between the first contact point and the second contact point, a ratio of the center resistance to the total resistance Rc/Rt corresponds to at least 0.5, a ratio of the first resistance to the total resistance R1/Rt ranges from 0.005 to 0.125, and a ratio of the second resistance to the total resistance R2/Rt ranges from 0.005 to 0.125.

3. The fluid permeable heater assembly according to claim 1, wherein a first transition resistance R1tp corresponds to the electrical resistance between two points situated on the longitudinal axis, one of the two points being situated at a distance from the first contact point equal to 20 percent and the other one of the two points being situated at a distance from the first contact point equal to 40 percent of the distance between the first and the second contact point, a second transition resistance R2tp corresponds to the electrical resistance between two points situated on the longitudinal axis, one of the two points being situated at a distance from the first contact point equal to 60 percent and the other one of the two points being situated at a distance from the first contact point equal to 80 percent of the distance between the first and the second contact point, a ratio of the first transition resistance to the first resistance R1tp/R1 ranges from 1.1 to 400, a ratio of the second transition resistance to the second resistance R2tp/R2 ranges from 1.1 to 400, a ratio of the center resistance to the first transition resistance Rc/R1tp ranges from 1.1 to 400, and a ratio of the center resistance to the second transition resistance Rc/R2tp ranges from 1.1 to 400.

4. The fluid permeable heater assembly according to claim 1, wherein a total resistance Rt corresponding to the electrical resistance between the first contact point and the second contact point ranges from 0.5 Ohm to 4 Ohm, the center resistance Rc is higher than 0.5 Ohm, and the first resistance R1 and the second resistance R2 are each lower than 100 mOhm.

5. The fluid permeable heater assembly according to claim 1, wherein the first side surface includes,
the first contact point, the second side surface includes,
the second contact point, and the first mesh density at the center surface is lower than the second mesh density at each of the first side surface and the second side surface, the first side surface and the second side surface being arranged on opposite sides of the center surface.

6. The fluid permeable heater assembly according to claim 5, wherein the mesh of each of the first side surface and the second side surface has a weft aperture larger than zero and no warp aperture.

7. The fluid permeable heater assembly according to claim 5, wherein in a weaving direction of the filament arrangement a same number of filaments are arranged next to each other in the center surface and in the first side surface and the second side surface.

8. The fluid permeable heater assembly according to claim 1, further comprising:

a substrate defining an opening through the substrate, the electrically conductive flat filament arrangement extending over the opening in the substrate; and a fastener attaching the flat filament arrangement to the substrate.

9. The fluid permeable heater assembly according to claim 8, wherein the fastener is electrically conductive and is an electrical contact configured to provide heating current through the filament arrangement.

10. The fluid permeable heater assembly according to claim 8, wherein the fastener is a mechanical fastener.

11. The fluid permeable heater assembly according to claim 10, wherein the mechanical fastener includes a clamp, a screw, a form-locking fastener, or any combination thereof.

12. The fluid permeable heater assembly according to claim 1, wherein the polymer includes polyetheretherketone (PEEK).

13. The fluid permeable heater assembly according to claim 1, wherein a mesh density of the central longitudinal region is higher than a mesh density of the edge region.

14. The fluid permeable heater assembly according to claim 1, wherein the center surface in the central longitudinal region has the first mesh density, the first side surface and the second side surface in the central longitudinal region have the second mesh density, the center surface in the edge region has a third mesh density lower than the first mesh density, and the first side surface and the second side surface in the edge region have a fourth mesh density lower than the second mesh density.

15. An electrically operated aerosol-generating system comprising:

an aerosol-generating device including, a main body defining a cavity, an electrical power source, and electrical contacts;

a cartridge configured to contain a liquid aerosol-forming substrate, the cartridge configured to be inserted in the cavity, the cartridge including, a housing having an opening; and the fluid permeable heater assembly of claim 1, the heater assembly extending across the opening of the housing of the cartridge, the electrical contacts configured to connect the electrical power source to the fluid permeable heater assembly.

* * * * *